(12) United States Patent
Richards et al.

(10) Patent No.: US 8,099,411 B2
(45) Date of Patent: Jan. 17, 2012

(54) SYSTEM, METHOD, AND COMPUTER-READABLE MEDIUM FOR APPLYING CONDITIONAL RESOURCE THROTTLES TO FACILITATE WORKLOAD MANAGEMENT IN A DATABASE SYSTEM

(75) Inventors: Anita Richards, San Juan Capistrano, CA (US); Douglas Brown, Rancho Santa Fe, CA (US)

(73) Assignee: Teradata US, Inc., Dayton, OH (US)

( * ) Notice: Subject to any disclaimer, the term of this patent is extended or adjusted under 35 U.S.C. 154(b) by 610 days.

(21) Appl. No.: 12/334,811

(22) Filed: Dec. 15, 2008

(65) Prior Publication Data
US 2010/0153958 A1    Jun. 17, 2010

(51) Int. Cl.
*G06F 17/30* (2006.01)
(52) U.S. Cl. ......... 707/719; 707/718; 707/720; 707/721
(58) Field of Classification Search ......... None
See application file for complete search history.

(56) References Cited

U.S. PATENT DOCUMENTS

| | | | |
|---|---|---|---|
| 7,302,450 B2 * | 11/2007 | Benedetti et al. | 1/1 |
| 7,509,336 B2 * | 3/2009 | Buckler | 1/1 |
| 7,657,508 B2 * | 2/2010 | Morris et al. | 707/999.002 |
| 7,693,847 B1 * | 4/2010 | Brown et al. | 707/694 |
| 7,702,676 B2 * | 4/2010 | Brown et al. | 707/713 |
| 7,769,843 B2 * | 8/2010 | Neuse et al. | 709/223 |
| 7,805,436 B2 * | 9/2010 | Richards et al. | 707/720 |
| 8,005,809 B2 * | 8/2011 | Buckler | 707/705 |
| 8,010,337 B2 * | 8/2011 | Narayanan et al. | 703/22 |

* cited by examiner

*Primary Examiner* — Debbie Le
(74) *Attorney, Agent, or Firm* — Steve McDonald

(57) ABSTRACT

A system, method, and computer-readable medium that facilitate workload management in a computer system are provided. A workload's system resource consumption is adjusted against a target consumption level thereby facilitating maintenance of the consumption to the target consumption within an averaging interval by dynamically controlling workload concurrency levels. System resource consumption is compensated during periods of over or under-consumption by adjusting workload consumption to a larger averaging interval. Further, mechanisms for limiting, or banding, dynamic concurrency adjustments to disallow workload starvation or unconstrained usage at any time are provided. Disclosed mechanisms provide for category of work prioritization goals and subject-area resource division management goals, allow for unclaimed resources due to a lack of demand from one workload to be used by active workloads to yield full system utilization at all times, and provide for monitoring success in light of the potential relative effects of workload under-demand, and under/over-consumption management.

20 Claims, 9 Drawing Sheets

SYSTEM, METHOD, AND COMPUTER-READABLE MEDIUM FOR APPLYING CONDITIONAL RESOURCE THROTTLES TO FACILITATE WORKLOAD MANAGEMENT IN A DATABASE SYSTEM

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost, e.g., response time, as determined by an optimizer. The response time is the amount of time it takes to complete the execution of a query on a given system.

In managing resource usage of a database management system to meet either subject-area resource distribution, e.g., by country, application or division, or category-of-work resource distribution, e.g., high vs. low priority, priority scheduling technologies have proven somewhat effective. However, when the goal is to manage resource distribution both by subject-area and category-of-work coincident with each other, and/or when the number of subject areas becomes too large or disparate, modern priority scheduling technologies have proven ineffective.

Further, when the goal is subject area resource distribution, the granularity of time to manage within is often in conflict with priority scheduling sub-system granularities. For example, a priority scheduler may properly distribute resources to concurrent requests within a small, e.g., 60 second time interval, but when the desire is to manage resource distribution within a larger time slice, such as 1 hour or 1 day, contemporary priority schedulers are incapable of managing to that level of granularity.

As an example, consider a particular database system that is shared between 100 enterprise divisions. Each division funds the cost of a respective portion of the system. In many scenarios, each division may fund a different portion of the database system. For example, one large division may fund 30% of the system, while a very small division may only fund 0.1% of the system. Because each division has funded a respective portion of the system, a system management goal may be to enforce division access to the system when the demand arises. When a particular division does not impose demand to the system, that division's resources should become available to the remaining divisions so as not to waste system resources. However, if the division subsequently begins submitting requests to the system, not only should that division be assured access to the resources within the current priority scheduler time interval, but also priority over other unused division resources in the time slices to follow until the division's share of resources are provided within the larger time interval. The relative policies of current priority schedulers are incapable of managing such a scenario for two key reasons. First, priority schedulers only manage resources within a small time interval. Further, contemporary priority schedulers are incapable of fairly managing a large number of divisions or other entities that may contend for system resources, particularly when the weights, or preferences, assigned to the contending entities vary widely.

SUMMARY

Disclosed embodiments provide a system, method, and computer readable medium for workload management in a computer system. A workload's system resource consumption is adjusted against a target consumption level thereby facilitating maintenance of the resource consumption to the target consumption within an averaging interval by dynamically controlling workload concurrency levels. System resource consumption is compensated during periods of over or under-consumption by adjusting workload consumption to a larger averaging interval. Further, mechanisms for limiting, or banding, dynamic concurrency adjustments to disallow workload starvation or unconstrained usage at any time are provided. Disclosed mechanisms provide for category of work prioritization goals and subject-area resource division management goals, allow for unclaimed resources due to a lack of demand from one workload to be used by active workloads to yield fall system utilization at all times, and provide for monitoring success in light of the potential relative effects of workload under-demand, and under/over-consumption management.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
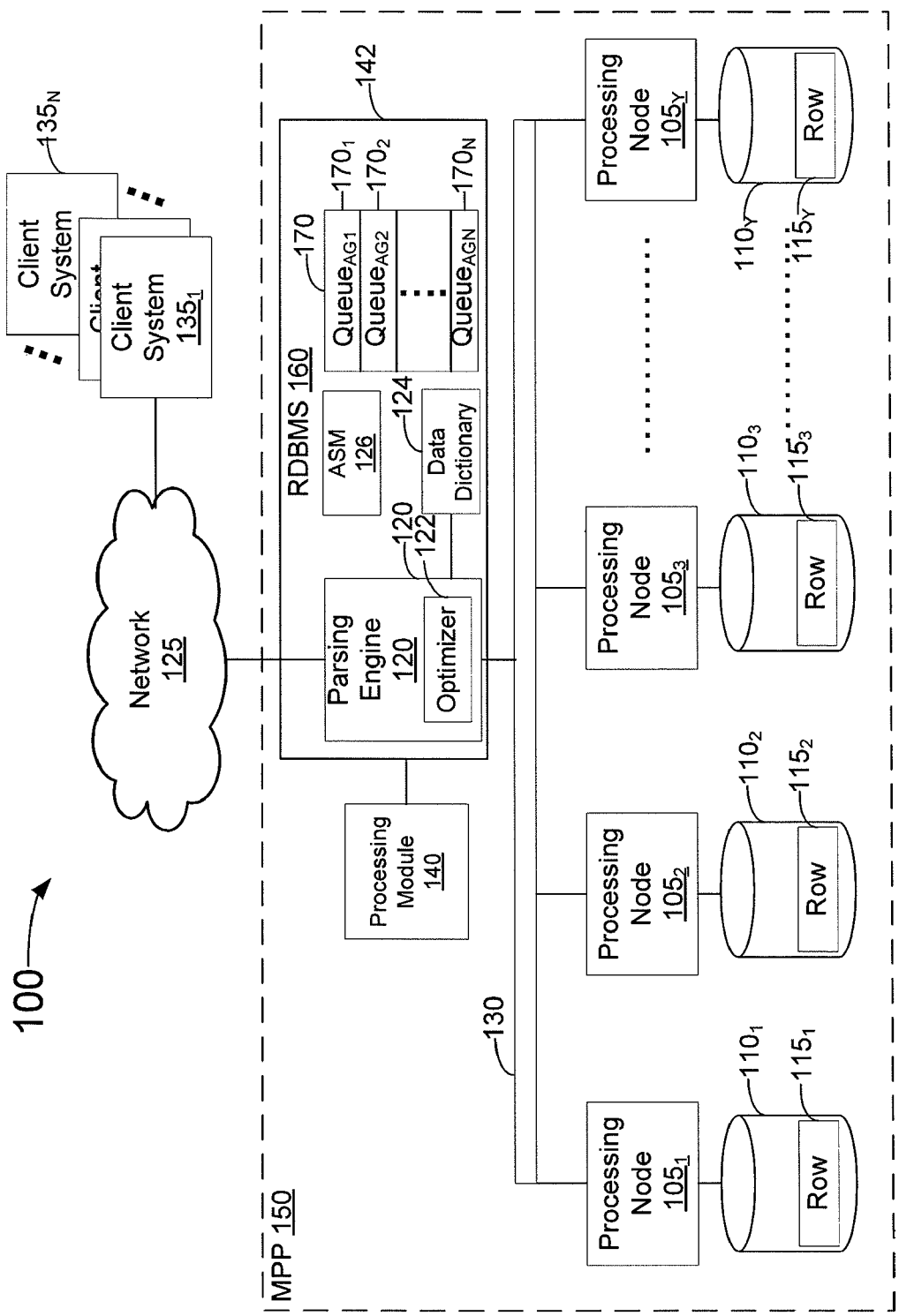
FIG. 1 depicts a diagrammatic representation of an exemplary architecture for a large database system that is suited for implementing conditional resource throttles that facilitate workload management in accordance with disclosed embodiments.

FIG. 1 depicts a diagrammatic representation of an exemplary architecture for a large database system 100, such as a Teradata Active Data Warehousing System, that is suited for implementing conditional resource throttles that facilitate workload (WD) management in accordance with disclosed embodiments. The database system 100 includes a relational database management system (RDBMS) 160 built upon a massively parallel processing (MPP) system 150.

As shown, the database system 100 includes one or more processing nodes $105_{1 \ldots Y}$ that manage the storage and retrieval of data in data-storage facilities $110_{1 \ldots Y}$. Each of the processing nodes may host one or more physical or virtual processing modules, such as one or more access module processors (AMPs). Each of the processing nodes $105_{1 \ldots Y}$ manages a portion of a database that is stored in a corresponding one of the data-storage facilities $110_{1 \ldots Y}$. Each of the data-storage facilities $110_{1 \ldots Y}$ includes one or more disk drives or other storage medium.

The system stores data in one or more tables in the data-storage facilities $110_{1 \ldots Y}$. The rows $115_{1 \ldots Y}$ of the tables are stored across multiple data-storage facilities $110_{1 \ldots Y}$ to ensure that the system workload is distributed evenly across the processing nodes $105_{1 \ldots Y}$. A parsing engine 120 organizes the storage of data and the distribution of table rows $115_{1 \ldots Y}$ among the processing nodes $105_{1 \ldots Y}$ and accesses processing nodes $105_{1 \ldots Y}$ via an interconnect 130. The parsing engine 120 also coordinates the retrieval of data from the data-storage facilities $110_{1 \ldots Y}$ in response to queries received from a user, such as one using one of a client computer system $135_1$-$135_N$ connected to the database system 100 through a network 125 connection. One or more of the client computer systems $135_1$-$135_N$ may be remotely located from one another, e.g., within different enterprise divisions or other entities. The parsing engine 120, on receiving an incoming database query, applies an optimizer 122 component to the query to assess the best plan for execution of the query. Selecting the optimal query-execution plan includes, among other things, identifying which of the processing nodes $105_{1 \ldots Y}$ are involved in executing the query and which database tables are involved in the query, as well as choosing which data-manipulation techniques will serve best in satisfying the conditions of the query. To this end, the parser and/or optimizer may access a data dictionary 124 that specifies the organization, contents, and conventions of one or more databases. For example, the data dictionary 124 may specify the names and descriptions of various tables maintained by the MPP system 150 as well as fields of each database. Further, the data dictionary 124 may specify the type, length, and/or other various characteristics of the stored tables. The database system typically receives queries in a standard format, such as the Structured Query Language (SQL) put forth by the American National Standards Institute (ANSI).

The system 100 may include an active system management (ASM) 126 module. The ASM may be implemented as a "closed-loop" system management (CLSM) architecture capable of satisfying a set of workload-specific goals. In other words, the system is a goal-oriented workload management system capable of supporting complex workloads and capable of self-adjusting to various types of workloads.

The system additionally includes a queue data structure 170 for maintaining workload queries that may not currently be dispatched for processing. In the illustrative example, the queue data structure 170 includes queues $170_1$-$170_N$ each ultimately allocated for a respective allocation group (AG). As referred to herein, an allocation group comprises a logical partitioning mechanism to which workloads may be assigned. A plurality of allocation groups may be defined that are each allocated a respective portion of one or more system resources, such as CPU resources. For example, one allocation group may be assigned 20% of the system CPU resources. In this manner, workloads assigned to a particular allocation group share the system resources provided to the allocation group. One allocation group may be assigned a greater portion of system resources than another based on, for example, the priority of workloads assigned to the allocation group. The parsing engine 120, the data dictionary 124, the ASM 126, and the queue data structure 170 may be implemented as computer-executable instruction sets tangibly embodied on a computer-readable medium, such as a memory device 142, that are retrieved by a processing module 140 and processed thereby.

The system's operation has four major phases: 1) assigning a set of incoming request characteristics to workload groups, assigning the workload groups to priority classes, and assigning goals (called Service Level Goals or SLGs) to the workload groups; 2) monitoring the execution of the workload groups against their goals; 3) regulating (adjusting and managing) the workload flow and priorities to achieve the SLGs; and 4) correlating the results of the workload and taking action to improve performance. The performance improvement can be accomplished in several ways: 1) through performance tuning recommendations such as the creation or change in index definitions or other supplements to table data, or to recollect statistics, or other performance tuning actions, 2) through capacity planning recommendations, for example increasing system power, 3) through utilization of results to enable optimizer self-learning, and 4) through recommending adjustments to SLGs of one workload to better complement the SLGs of another workload that it might be impacting. All recommendations can either be enacted automatically, or after "consultation" with the database administrator (DBA).

The DBS 100 described herein accepts performance goals for each workload as inputs, and dynamically adjusts its own performance, such as by allocating DBS 100 resources and throttling back incoming work. In one example system, the performance parameters are referred to as priority scheduler parameters. When the priority scheduler is adjusted, weights assigned to resource partitions and allocation groups are changed. Adjusting how these weights are assigned modifies the way access to system resources, e.g., the CPU, disk and memory, is allocated among requests. Given performance objectives for each workload and the fact that the workloads may interfere with each other's performance through competition for shared resources, the DBS 100 may find a performance setting that achieves one workload's goal but makes it difficult to achieve another workload's goal.

The performance goals for each workload will vary widely as well, and may or may not be related to their resource demands. For example, two workloads that execute the same application and DBS 100 code could have differing performance goals simply because they were submitted from different departments in an organization. Conversely, even though two workloads have similar performance objectives, they may have very different resource demands.

Figure 2:
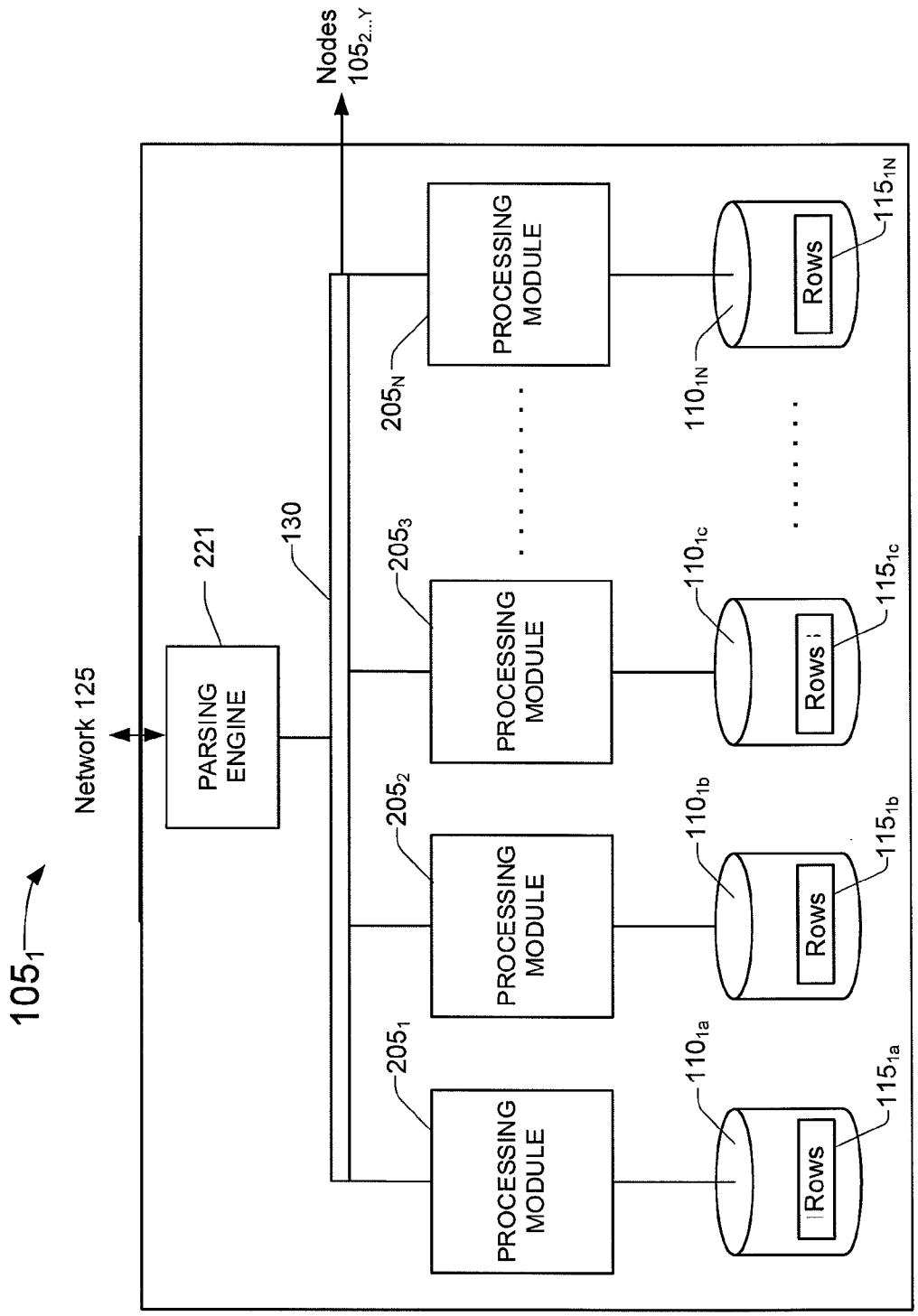
FIG. 2 depicts a diagrammatic representation of a sample architecture for one node of a database system in which implementations of the disclosed embodiments may be deployed.

FIG. 2 depicts a diagrammatic representation of a sample architecture for one node $105_1$ of the DBS 100. The DBS node $105_1$ includes one or more processing modules $205_{1...N}$ connected by an interconnect 130 that manage the storage and retrieval of data in data-storage facilities $110_{1a...1N}$. Each of the processing modules $205_{1...N}$ may be one or more physical processors or each may be a virtual processor, with one or more virtual processors running on one or more physical processors. For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $205_{1...N}$ manages a portion of a database that is stored in a corresponding one of the data-storage facilities $110_{1a...1N}$. Each of the data-storage facilities $110_{1a...1N}$ includes one or more disk drives. The DBS may include multiple nodes $105_{2...Y}$ in addition to the illustrated node $105_1$, connected by way of the interconnect 130.

The system stores data in one or more tables in the data-storage facilities $110_{1a...1N}$. The rows $115_{1a...1N}$ of the tables are stored across multiple data-storage facilities $110_{1a...1N}$ to ensure that the system workload is distributed evenly across the processing modules $205_{1...N}$. A parsing engine 221 organizes the storage of data and the distribution of table rows $111_{1a...1N}$ among the processing modules $205_{1...N}$. The parsing engine 221 also coordinates the retrieval of data from the data-storage facilities $110_{1a...1N}$ in response to queries received from a user at a client computer system $135_{1...N}$. The DBS 100 usually receives queries and commands to build tables in a standard format, such as SQL.

In one implementation, the rows $115_{1a...1N}$ are distributed across the data-storage facilities $110_{1a...1N}$ by the parsing engine 221 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $110_{1a...1N}$ and associated processing modules $205_{1...N}$ by a hash bucket map. The characteristics of the columns chosen for the primary index determine how evenly the rows are distributed.

Figure 3:
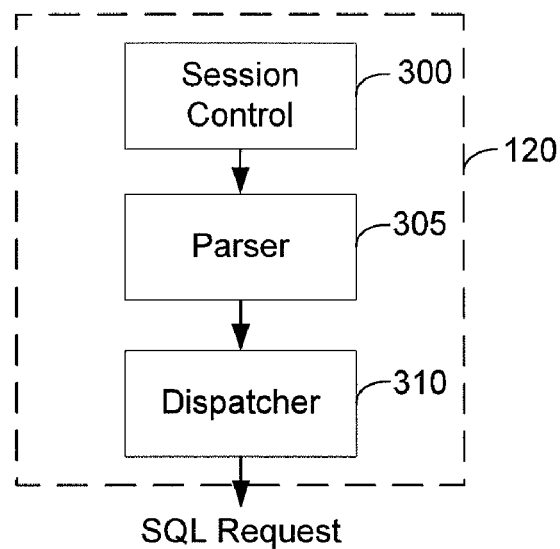
FIG. 3 is a diagrammatic representation of a parsing engine implemented in accordance with an embodiment.
Figure 4:
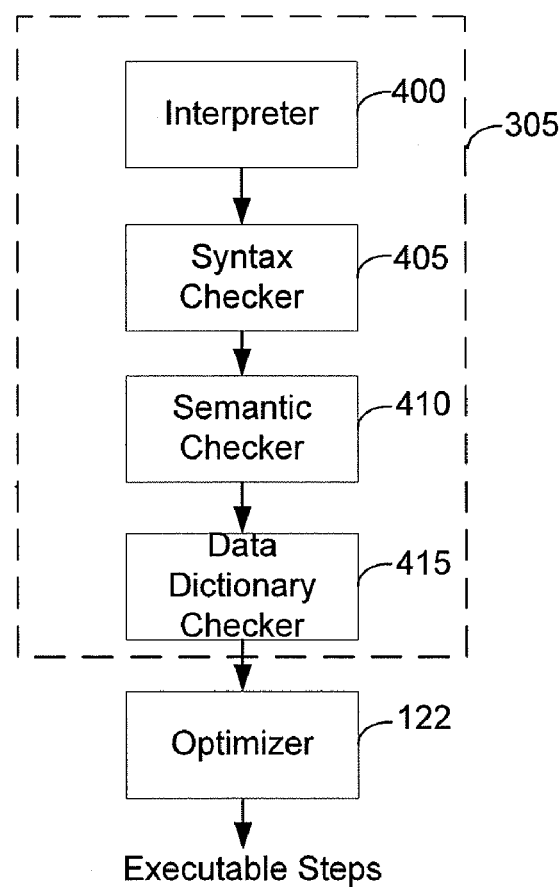
FIG. 4 is a diagrammatic representation of a parser implemented in accordance with an embodiment.

In one example system, a parsing engine, such as the parsing engine 120, is made up of three components: a session control 300, a parser 305, and a dispatcher 310 as shown in FIG. 3. The session control 300 provides the logon and logoff functions. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults a data dictionary to ensure that all of the objects specified in the SQL request exist and that the user has the authority to perform the request (block 415). Finally, the parser 305 runs the optimizer 122 that selects the least expensive plan to perform the request.

Figure 5:
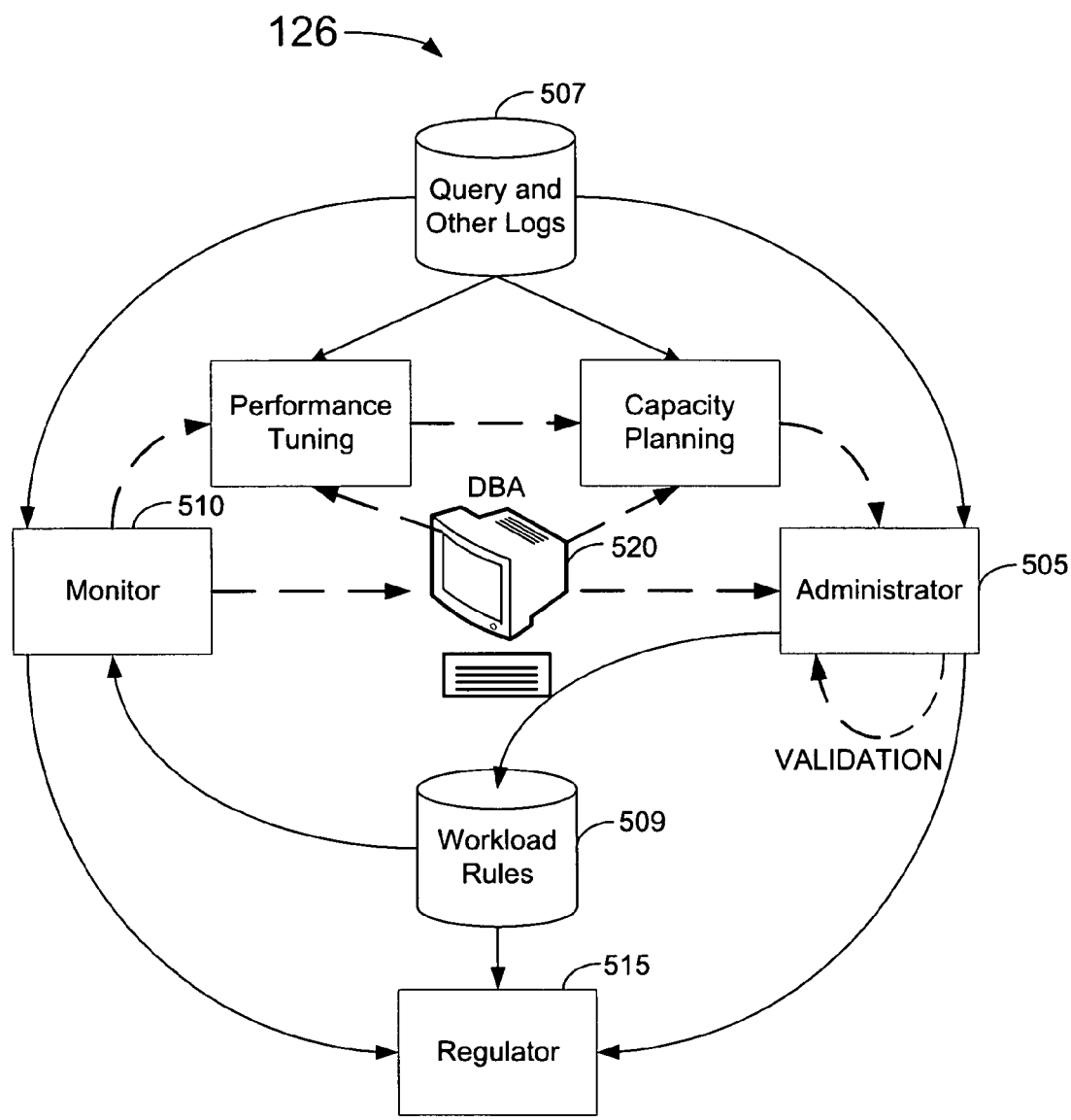
FIG. 5 is a diagrammatic representation of an exemplary active system management implemented in accordance with an embodiment.

FIG. 5 is a diagrammatic representation of an exemplary ASM 126 implemented in accordance with an embodiment. The ASM may include an administrator 505 that provides, for example, a graphical user interface (GUI) to define workloads and their SLGs and other workload management requirements. The administrator 505 accesses data in logs 507 associated with the system, including a query log, and receives capacity planning and performance tuning inputs as discussed above. The administrator 505 is a primary interface for the DBA 520. The administrator also establishes workload rules 509, which are accessed and used by other elements of the system.

A monitor 510 component provides a top level dashboard view, and the ability to drill down to various details of workload group performance, such as aggregate execution time, execution time by request, aggregate resource consumption, resource consumption by request, etc. Such data is stored in the query log and other logs 507 available to the monitor.

Some of the monitor functionality may be performed by the regulator 515 that comprises a component that dynamically adjusts system settings and/or projects performance issues and either alerts the DBA 520 or user to take action, for example, by communication through the monitor 510, which is capable of providing alerts, or through an exception log, providing a way for applications and their users to become aware of, and take action on, regulator actions. Alternatively, the regulator 515 can automatically take action by deferring requests or executing requests with the appropriate priority to yield the best solution given requirements defined by the administrator 505.

In accordance with disclosed embodiments, conditional resource throttles that operate on workload-specific consumption are implemented in the database system 100. For example, rather than queuing and releasing an incoming request based on concurrency levels alone as is allowed in contemporary system, incoming request may be queued and released based on a CPU consumption of a workload. As referred to herein, a concurrency level of a WD specifies the number of queries of the WD that may be concurrently processed. Consumption measures may further be evaluated against a specified interval, for example consumption within the last hour relative to an hourly allotment associated with the workload. Then that consumption may be enforced relatively, allowing full system usage when certain workloads are inactive.

In accordance with an embodiment, the database administrator (DBA) inputs parameters for conditional workload throttles of WDs. Conditional workload throttles may include one or more of, for example, a target relative CPU %, a concurrency restriction band, e.g., a minimum concurrency (MinCon) and maximum concurrency (MaxCon), an averaging interval (e.g., the time interval for computing a moving average), and an event interval.

The DBA may define any number of workloads for each of the divisions or entities, e.g., in which client systems $135_{1...N}$ are deployed, including any differing category-of-work priority distinctions. Each of the workloads may be mapped to a respective allocation group based on the category-of-work needs (e.g., tactical, high, medium, background). The DBA may choose to not enforce any throttles against short running, high-priority work of any division. However, medium to low priority work may be subject to a CPU resource throttle equivalent to the portion of the database system that the corresponding division is funding or is otherwise allocated. The DBA may further define the granularity of this evaluation, i.e., the averaging interval. For example, the averaging interval could be defined as one hour.

Because subject-area resource distribution is managed through throttles instead of priority scheduler weights, the priority scheduler is left to effectively manage executing query priority via the few allocation groups defined for category-of-work management.

In summary, conditional resource throttles have the following advantages and end-goals. The conditional resource throttles enable the coexistence of subject-area resource division and category of work priority management schemes, may operate on a longer time span than contemporary priority scheduler facilities (PSFs) are capable, e.g., manage average consumption to the hour(s) as opposed to by a single minute, provide more granular throttling control than can be achieved through concurrency limits alone, and are flexible enough to work in the relative sense versus the absolute sense of PSF CPU limits for less wasted resources. For example, the conditional resource throttles may balance the under-consumption of a workload by allowing a period of over-consumption to net the target CPU % for the averaging interval.

In support of providing the co-existence of "subject-area resource division" workload management and "category of work" priority management, the conditional resource throttle mechanisms disclosed herein provide for workload management in light of allocation group relative weight differences thereby maintaining PSF's ability to adjust category of work weighting based on actual activity levels. Therefore, the DBA will specify a target "relative CPU utilization" rather than a target system CPU utilization for the conditional resource throttle to manage.

As an example, consider a system with five workloads that are mapped to a total of 2 allocation groups (AGs) according to the following:

WorkloadH1, Workload H2 map to AG H with a weight of 67

WorkloadM1, WorkloadM2 and WorkloadM3 map to AG M with a weight of 33.

The PSF may function according to the following in accordance with an embodiment. When no activity exists in WorkloadH1 and Workload H2, the AG H is inactive resulting in its weight (67) being distributed to all remaining AGs in the system (in this case AG M). Thus, during this time, the actual relative weight given to AG M, and therefore Workloads M1, M2 and M3, is 100%.

The conditional resource throttle requires the DBA to specify the target relative CPU utilization, meaning the target percentage of the AG's allotment given by the PSF. In the example above, if workload M1's target relative CPU utilization is specified to be 50% of AG M, and workloads M2 and M3 are specified to be 25% each of AG M, the following would result depending on if workloads H1 and H2 are active:

Workload H1 or H2 active: Workload M1 would get 50% of 33%=16.5% of the CPU Utilization.

Workloads M2 and M3 would get 25% of 33%=8.25% of the system CPU utilization.

Workload H1 and H2 inactive: Workload M1 would get 50% of 100%=50% of the CPU Utilization.

Workloads M2 and M3 would get 25% of 100%=25% of the system CPU utilization.

To better explain this concept of controlling CPU with concurrency, consider four normal priority workloads (designated WD-A-WD-D) sharing a common allocation group with a conditional resource throttle defined with the following target CPU % to be enforced across each "rolling" (i.e., moving) hour:

WD-A: 47.6%
WD-B: 28.6%
WD-C: 19.0%
WD-D: 4.8%
Total 100.0%

Because throttles do not manage query priority, all queries submitted by any of these workloads will be given equal priority on the system. That is, if three of the workloads each have three queries running each executing query would consume 100%/9=11.1%, and each executing workload would consume 33% of the resources and the fourth workload would consume 0 resources rather than the distribution desired by the conditional resource throttles. Besides the lack of demand from the fourth workload, the hourly resource consumption of the other three workloads can only be made to match the conditional resource throttle values through throttling future incoming queries. Thus, in accordance with disclosed embodiments, mechanisms for determining when to evaluate consumption and how to adjust throttling actions as a result of recent past consumption are provided.

Consider a request that is already executing. Two events may occur that change the resource allocation that that request is given: 1) a change in other competing queries, and 2) a change in priority scheduler competition. In the case of competing queries, consider the example provided above. If, for instance, 30 queries are executing, each request received 3.3% of the system resources. If 10 more queries were to begin executing, each query would now get 2.5% of the system resources. Alternatively, if ten of the 30 queries completed or were aborted, the remaining 20 requests would then receive 5.0% of the resources. In the event of priority scheduler competition, higher priority requests will receive a disproportionately higher share of system resources. For example, if 10 of the 30 queries executing in the above example were higher priority and therefore assigned to a different allocation group that has been configured to receive twice the resources of the normal allocation group, the ten higher priority requests would be collectively allocated 67% of the system resources, while the 20 normal priority requests would share the remaining 33% for 1.65% of the system resources each. However, as noted earlier, the target is based on a "relative CPU %" rather than a system CPU % target, allowing the PSF to focus on priority management and leaving conditional resources to focus on subject-area-resource division goals. Therefore, these effects are effectively eliminated for purposes of this discussion.

Additionally, exceptions on a request may cause many actions, most notably: change of workload group (and, therefore, allocation group/priority), or aborting of the request. The effect of exceptions is therefore as outlined in points 1 and 2 above. Restated with respect to the workload and without system-wide consideration but only considering the localized allocation group, there are two mechanisms that may change the percent of an allocation group's resource consumption of an individual workload: 1) workload concurrency level, and 2) other workload concurrency level(s). With regard to the workload concurrency level, the higher the workload concurrency, the higher the workload as a whole will obtain the allocation group resources. With regard to the other workload concurrency level, the higher the other workload concurrencies, the lower the workload as a whole will obtain the allocation group resources.

Figure 6A:
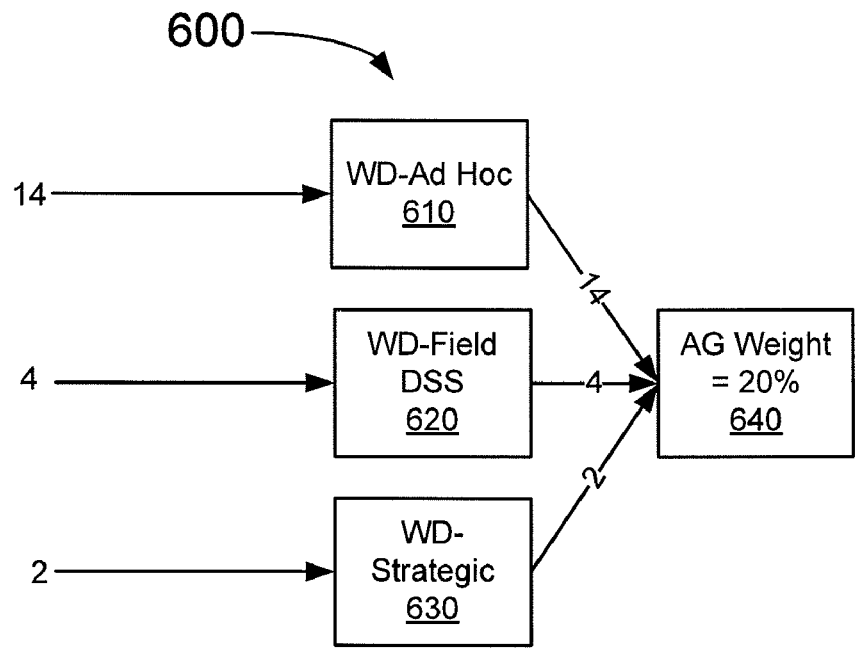
FIG. 6A depicts a diagrammatic representation of three exemplary workloads that operate unconstrained by throttles.

With reference now to FIG. 6A, there is depicted a diagrammatic representation 600 of three exemplary workloads 610-630 that operate unconstrained by throttles. In this instance, the workload's share of the allocation group resources is dictated primarily by concurrency levels. In the illustrative example, the total allocation group (AG) weight 640 comprises 20% of the system resources, of which the ad hoc workload 610 is allocated 70% (14 of 20) of the AG weight, the field DSS workload 620 is allocated 20% (4 of 20), and the strategic workload 630 is allocated 10% (2 of 20).

Figure 6B:
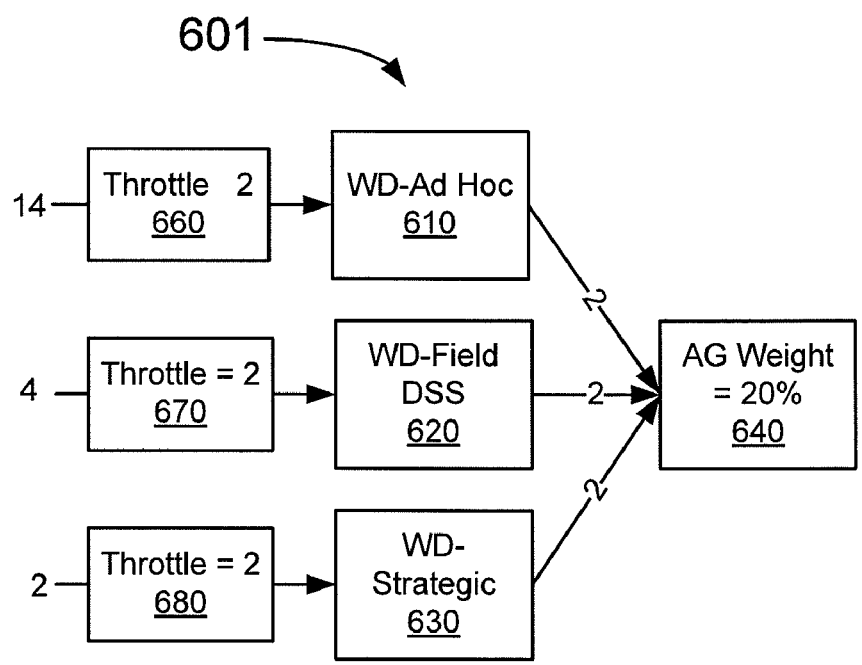
FIG. 6B depicts a diagrammatic representation of the three exemplary workloads of FIG. 6A each having a concurrency throttle applied thereto in accordance with disclosed embodiments.

In contemporary systems, a workload's share of allocation group resources may be made only via concurrency throttles. For example, consider the diagrammatic representation 601 of the three workloads 610-630 in FIG. 6B. In this configuration, each of concurrency throttles 660-680 is set to a concurrency throttle value of "2" and are respectively applied to each of the workloads 610-630 sharing the common allocation group resources. By this mechanism, each workload is allocated one third of the allocation group resources 640.

Returning to the example introduced hereinabove with 30 queries executing and each consuming 3.3% of the system resources, consider the resource patterns summarized in Table 1 for the end of an event interval:

TABLE 1

| Workload | Target CPU % | Actual CPU % | Consumption Status |
|---|---|---|---|
| WD-A: | 47.6% | 33% | Under-consuming |
| WD-B | 28.6% | 0% | Under-consuming |
| WD-C | 19.0% | 33% | Over-consuming |
| WD-D | 4.8% | 33% | Over-consuming |
| Total | 100% | 100% | |

In accordance with disclosed embodiments, it is the task of the conditional resource throttles to bring the actual consumption, as measured by the rolling average, back into conformity with the target CPU % and to achieve the conformity by virtue of concurrency control alone. To this end, a conditional resource throttle algorithm is employed. The conditional resource throttle is provided with a target relative CPU % (T), an averaging interval (AI), a global event interval (EI), and, optionally, a concurrency restriction band (MinCon, MaxCon) from the DBA or other personnel.

Further, the conditional resource throttle receives data obtained from monitoring performed by the regulator 515, including current by-WD CPU % of the allocation group (CurWDCPUofAG) that may be derived from a current by-WD CPU % (CurWDCPU), and a current by-AG CPU % (CurAGCPU) as (CurWDCPUofAG=CurWDCPU/CurAGCPU).

Further, data obtained by the regulator 515 may include current by-WD concurrency ($A_c$) for active concurrent queries, rolling average by-WD concurrency ($A_r$), and a rolling average by-WD CPU % (RollWDCPUofAG) that is derived from the rolling average by-WD CPU % (RollWDCPU), and a rolling average by-AG CPU % (RollAGCPU) as (RollWDCPUofAG=RollWDCPU/RollAGCPU)

For each WD with a conditional resource throttle defined therefor, the following analysis may be performed, in addition to a potential concurrency throttle adjustment, at every event interval. A theoretical concurrency level ($C_c$) is derived that would drive the CPU utilization back to the WD target. The theoretical concurrency level may be calculated according to the following:

$$C_c=(T*A_c)/CurWDCPUofAG$$

A theoretical rolling average concurrency level ($C_r$) that would drive the rolling average of the CPU utilization back to target may be calculated according to the following:

$$C_r=(T*A_r)/RollingWDCPUofAG$$

The WD's concurrency throttle ($C_n$) may then be set to, for example, the average of $C_c$ and $C_r$, e.g., $C_n$=Average($C_c$, $C_r$). In the event that the theoretical concurrency level, $C_c$, is unlimited, then the concurrency throttle, $C_n$, may be set to the rolling average concurrency level ($C_n=C_r$). An evaluation may then be made to determine if any queries in the queue may be released based on the new throttle value. Note, the associated overhead of this evaluation should be no more than the overhead to determine if a query may be released from the workload queue upon completion of another query in the workload, or the overhead of evaluating if a new arrival can be executed versus queued.

Figure 7:
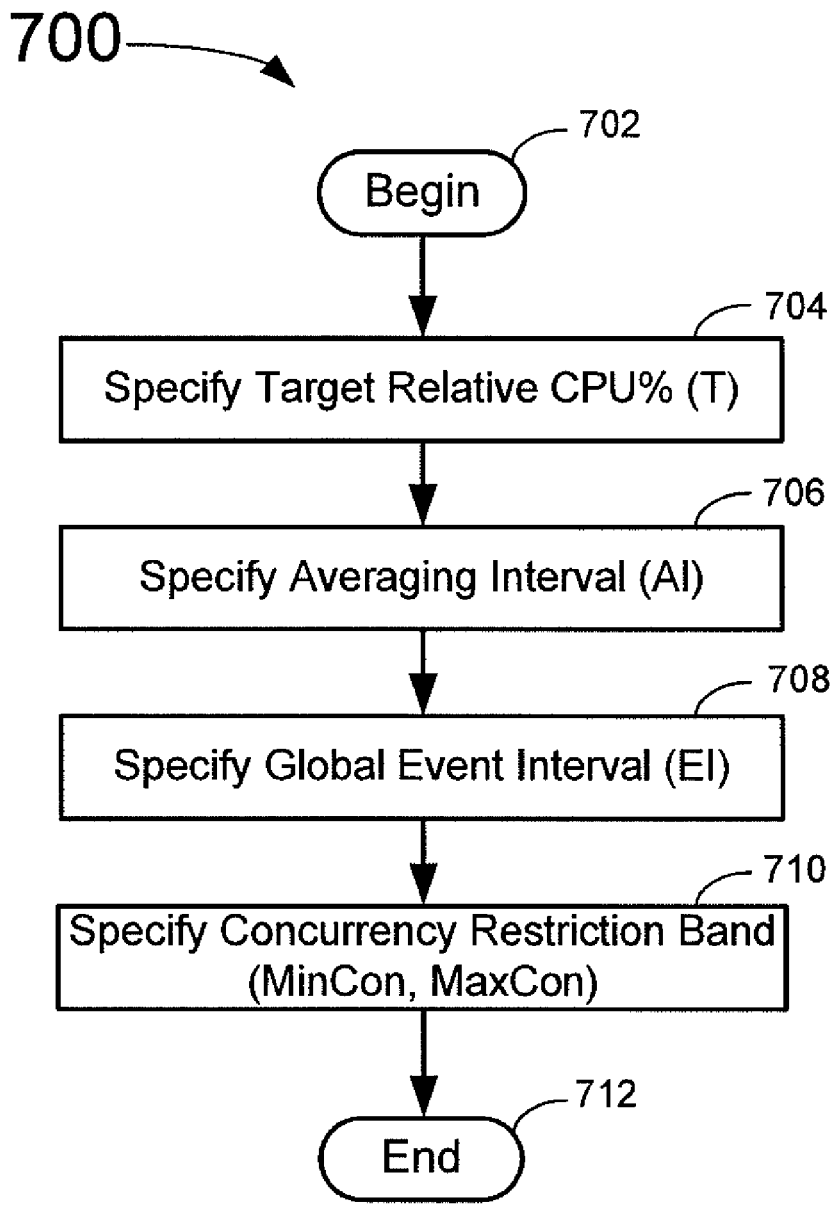
FIG. 7 is a flowchart of a conditional resource throttle configuration routine implemented in accordance with disclosed embodiments.

FIG. 7 is a flowchart 700 of a conditional resource throttle configuration routine implemented in accordance with disclosed embodiments. The processing steps of FIG. 7 may be implemented as computer-executable instructions tangibly embodied on a computer-readable medium executable by a processing system, such as the processing module 140 depicted in FIG. 1.

The conditional resource throttle configuration routine is invoked (step 702), and a DBA or other entity specifies a target relative CPU % (T) for a workload (step 704). The target relative CPU % represents the desired target CPU % consumption of the particular workload relative to the allocation group to which the workload is assigned. An averaging interval (AI) (step 706) and a global event interval (EI) (step 708) are also specified for the workload. The averaging interval specifies the interval over which a rolling average of system resource consumption for the WD is calculated. For example, the rolling average may be specified as an hour. The workload management routine then maintains a rolling average of the workload's consumption over the previous hour. The rolling average may be recalculated at a specified or default Event interval (EI), e.g., such as every minute. The global event interval specifies the interval at which the workload consumption is evaluated for possible concurrency throttle adjustments and rolling average computations. A concurrency restriction band (MinCon, MaxCon) may optionally be specified for the workload (step 710). The concurrency restriction band specifies the minimum and maximum queries of the workload that may be concurrently processed. For example, a concurrency restriction band of (MinCon=1, MaxCon=10) specifies that the workload must be allowed processing of at least one query and a maximum of ten queries at any time, overriding $C_n$ if necessary. The conditional resource throttle configuration routine cycle may then end (step 712).

Figure 8:
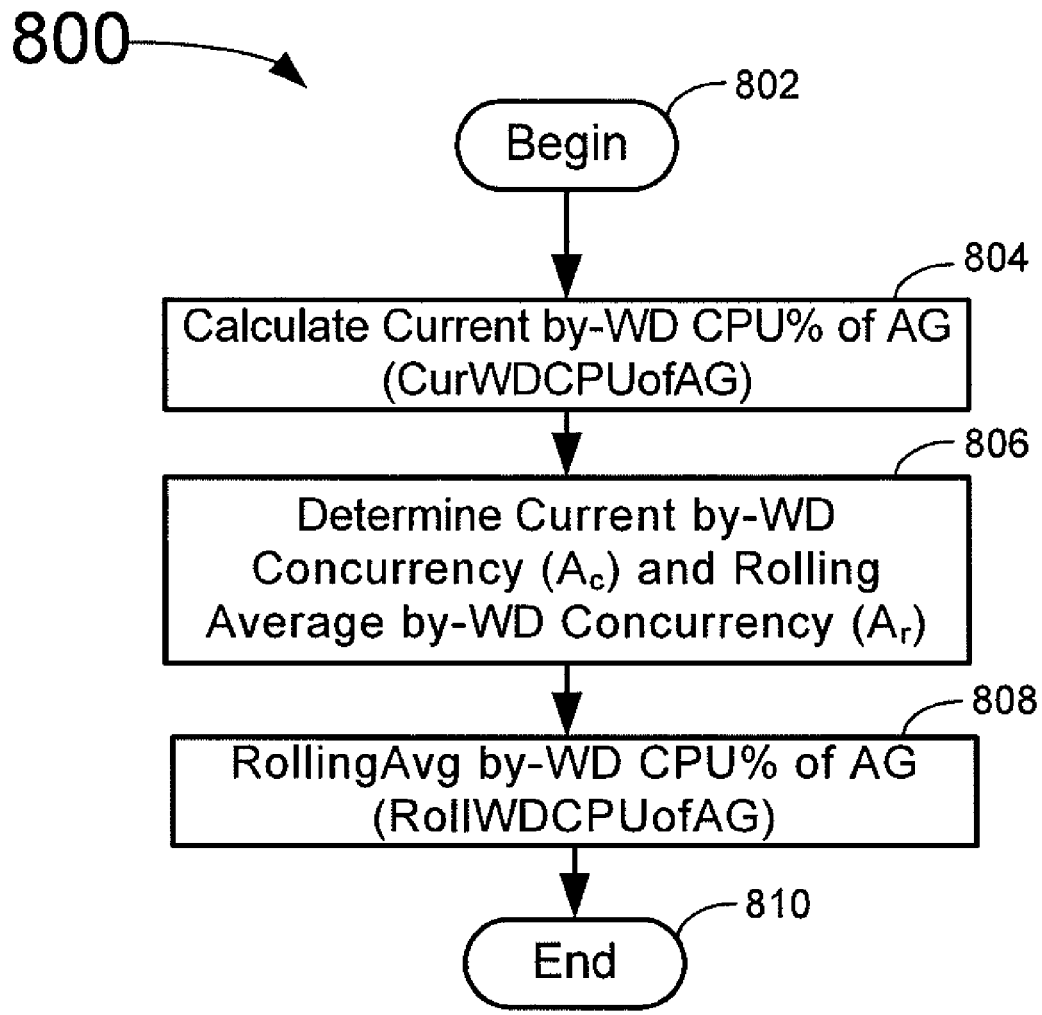
FIG. 8 is a flowchart of an internal regulator monitoring routine for facilitating conditional resource throttle workload management implemented in accordance with disclosed embodiments.

FIG. 8 is a flowchart 800 of an internal regulator 515 monitoring routine for facilitating conditional resource throttle workload management implemented in accordance with disclosed embodiments. The processing steps of FIG. 8 may be implemented as computer-executable instructions tangibly embodied on a computer-readable medium executable by a processing system, such as the processing module 140 depicted in FIG. 1.

The internal regulator monitoring routine is invoked (step 802), and a current by-WD CPU % of AG (CurWDCPUofAG) value is calculated (step 804). The current by-WD CPU % of AG specifies the CPU % consumed by the workload specific to the AG to which the WD is assigned. The regulator may calculate the current by-WD CPU % of AG value from the current by-WD CPU % (CurWDCPU) and the current by-AG CPU % (CurAGCPU). The current by-WD CPU % specifies the system-wide CPU percentage currently consumed by the WD, and the current by-AG CPU % specifies the system-wide CPU % currently consumed by the AG, i.e., the current system-wide CPU % collectively consumed by all WDs of the AG. In this manner, the current by-WD CPU % of AG may be calculated according to the following:

$$CurWDCPUofAG = CurWDCPU/CurAGCPU \qquad \text{eq. 1}$$

The regulator additionally determines a current by-WD Concurrency ($A_c$) value and a rolling average by-WD concurrency ($A_r$) (step 806). The current by-WD Concurrency value specifies the number of active queries of the workload that are concurrently being processed. The regulator further calculates a rolling average by-WD CPU % of AG (RollWDCPUofAG) value (step 808). The rolling average by-WD CPU % of AG specifies the CPU consumption percentage of the WD relative to the AG to which the WD is assigned over the rolling averaging interval. For example, if the averaging interval (AI) is specified as one hour, the rolling average by-WD CPU % of AG specifies the CPU % of the AG consumed by the WD over the previous hour. The rolling average by-WD CPU % of AG may be calculated by a specified or default Event interval (EI), e.g., every minute. The rolling average by-WD CPU % of AG may be derived from the rolling average by-WD CPU % (RollWDCPU) and the rolling average by-AG CPU % (RollAGCPU). The rolling average by-WD CPU % value specifies the system-wide CPU % consumed by the WD over the previous averaging interval, and the rolling average by-AG CPU % specifies the system-wide CPU % consumed by the AG to which the WD is assigned over the previous averaging interval. The rolling average by-WD CPU % of AG by be calculated according to the following:

$$RollWDCPUofAG = RollWDCPU/RollAGCPU \qquad \text{eq. 2}$$

The internal regulator 515 monitoring routine cycle may then end (step 810). The evaluations may be repeated upon expiration of another event interval.

Figure 9:
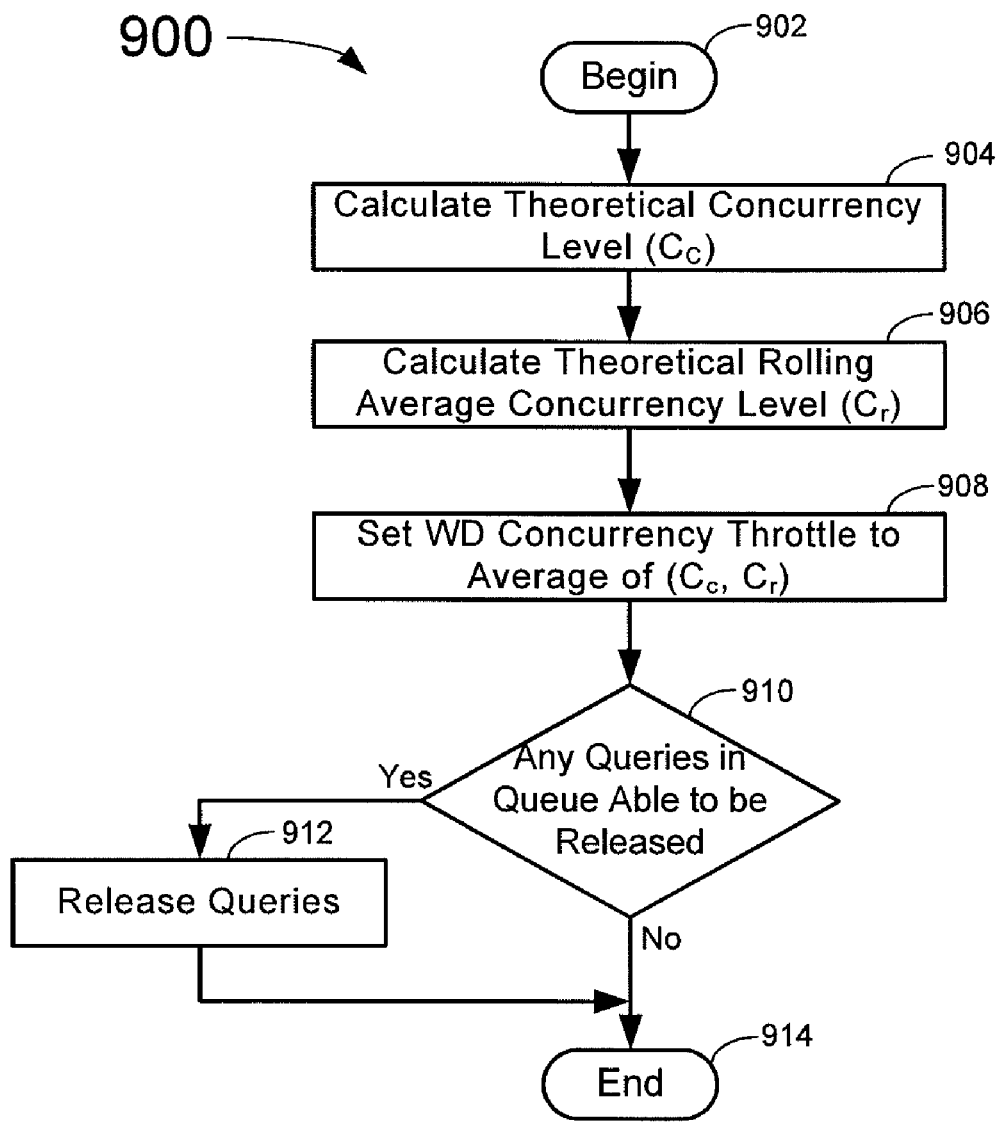
FIG. 9 is a flowchart of a conditional resource throttle evaluation and adjustment routine for facilitating conditional resource throttle workload management implemented in accordance with disclosed embodiments.

FIG. 9 is a flowchart 900 of a conditional resource throttle evaluation and adjustment routine for facilitating conditional resource throttle workload management implemented in accordance with disclosed embodiments. The processing steps of FIG. 9 may be implemented as computer-executable instructions tangibly embodied on a computer-readable medium executable by a processing system, such as the processing module 140 depicted in FIG. 1.

The evaluation and adjustment routine is invoked (step 902), e.g., upon expiration of the event interval (EI) specified for the WD at step 708 of FIG. 7. A theoretical concurrency level ($C_c$) is calculated (step 904). The theoretical concurrency level specifies a concurrency level as a number of queries of the WD that may be concurrently processed that would drive the current CPU % consumption of the WD back to the target relative CPU % (T). The theoretical concurrency level may be calculated according to the following:

$$C_c = (T*A_c)/CurWDCPUofAG \qquad \text{eq. 3}$$

Alternatively, in the event the current by-WD CPU % of AG is zero, $C_c$ may be set to the maximum concurrency (MaxCon).

A theoretical rolling average concurrency level (Cr) may then be calculated (step 906). The theoretical rolling average concurrency level specifies a concurrency level as a number of queries of the WD that may be concurrently processed that would drive the rolling average CPU % consumption of the WD back to the target consumption level. The theoretical rolling average concurrency level may be calculated according to the following:

$$C_r = (T*A_r)/RollingWDCPUofAG \qquad \text{eq. 4}$$

Alternatively, in the event the rolling by-WD CPU % of AG is zero, $C_r$ may be set to the maximum concurrency (MaxCon).

The concurrency throttle ($C_n$) of the WD may then be adjusted according to, for example, an average of the theoretical concurrency level and theoretical rolling average concurrency level values (step 908), e.g., according to the following:

$$C_n = \text{Average}(C_c, C_r) \qquad \text{eq. 5}$$

Each of the theoretical concurrency level, theoretical rolling average concurrency level, and the concurrency throttle values may respectively specifies an integer number of queries of the WD that may be concurrently processed. An evaluation may then be made to determine if any queries of the WD currently queued may be released for processing (step 910). For example, if the concurrency throttle, $C_n$, previously had a value of "2" and the adjustment of step 908 resulted in the concurrency throttle being increased to "3", a query of the WD currently queued may then be released for processing from the queue data structure 170. In the event a query may be released, the query is released from the queue (step 912), and the evaluation and adjustment cycle may then end (step 914). If it is determined at step 910 that a queued query may not be released, the evaluation and adjustment routine cycle may then end according to step 912. The evaluation and adjustment routine cycle may be repeated upon expiration of another event interval.

Figure 10:
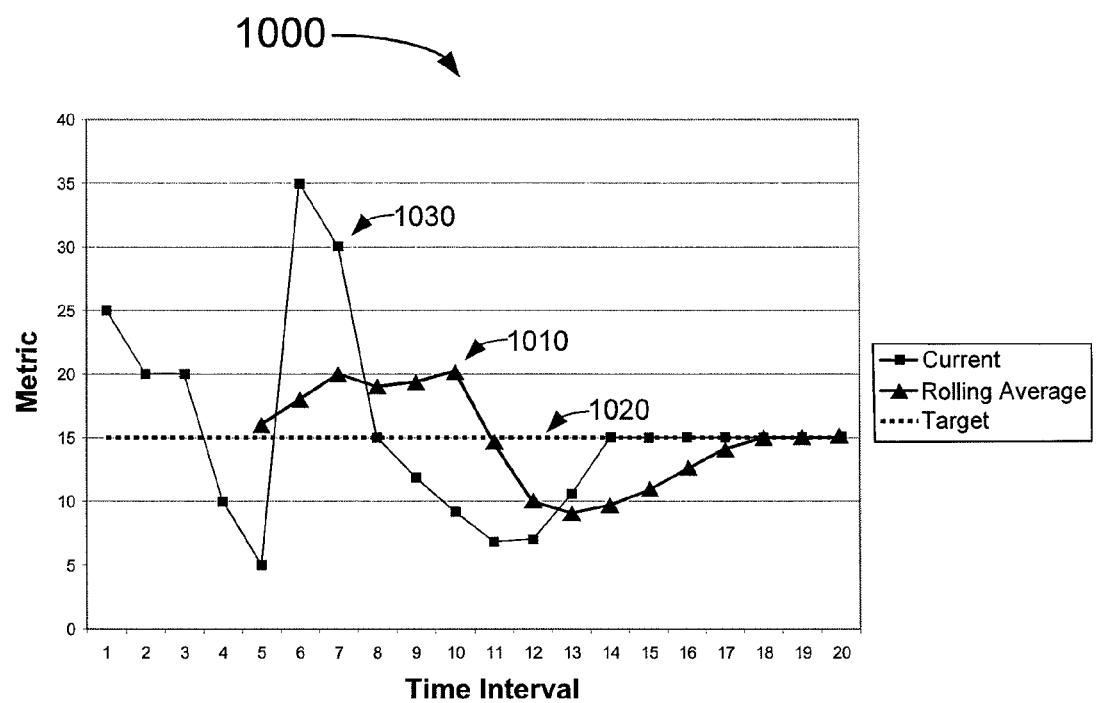
FIG. 10 is a diagrammatic representation of a resource consumption graph.

Consider the illustrative example of a workload that was allowed to over-consume system resources for a period of time as depicted by the resource consumption graph 1000 of FIG. 10. The task of the conditional resource throttle is to bring the workload's CPU consumption back to the target. As can be seen from the rolling average plot 1010, the average system resources consumed exceeded the target system resource consumption (depicted by the plot 1020) during an interval spanning approximately from the time interval "5" to the time interval "10". Accordingly, the current system resource consumption (depicted by the plot 1030) was throttled to bring the system resource consumption below the target consumption level for an interval spanning approximately from the time interval "8" through "14" at which point the current consumption level substantially equaled the target consumption level. In this manner, the rolling average consumption level eventually substantially merges with the target consumption level. Notably, the workload management routine is configured to bring and maintain the rolling average consumption back to conformity with the target consumption. In other words, a workload that has been allowed to over-consume must be compensated for by under-consuming for a period of time. Likewise, a workload that under-consumes with respect to the target may be adjusted to temporarily over-consume.

Advantageously, the workload management mechanisms implemented in accordance with disclosed embodiments provide for temporary non-conformance to reach a CPU or other system resource usage goal defined for a larger interval such as an hour. Contemporary concurrency throttles utilize a check to release a query from the delay queue to be made as a new query is submitted or as a running query completes. Conditional resource throttle routines cannot rely on a query being available in the queue when it determines to increase CPU resources for the workload. Therefore, a capability must exist to provide some limited "catch-up" capability when the query demand is present again.

Otherwise, consider a strict conditional resource throttle that does not allow catch-up capabilities. As long as actual query arrivals meet or exceed the demand required by the conditional resource throttle, the CPU target specification can be controlled by throttling back actual arrivals to the specified rate. However, if arrival rates occur sporadically such that there are intervals of time when there is no query demand followed by an interval with a surge of demand, the strict conditional resource throttle results in an under-consumption when there was no demand but would still disadvantageously enforce the condition that the queries executed during the surge do not exceed the target CPU usage specification. This may result in an aggregate hourly CPU consumption that can be far less than the specified target for that same hour. While this is the desired enforcement for some situations, for other situations more flexibility is desired.

The other extreme would be to allow infinite catch-up. That is, if the system submitted no demand for hours, even days, and then a large surge in arrivals occurred, infinite catch-up might allow for the entire surge of arrivals to execute with no throttling control, followed by a long period of time when no queries were allowed to run. Clearly, such a situation could defeat the purpose of having conditional resource throttles.

The duration of the averaging interval therefore dictates the degree of "catch-up" that should be allowed to achieve target CPU % goals in accordance with disclosed embodiments. A shorter averaging interval results in less catch-up compared with longer averaging intervals.

The longer the averaging interval, the greater the probability that the system can enforce the target consumptions because controlling resource consumption through throttles is only as responsive as query arrivals and completions allow. Therefore, resource consumption targets can better be realized when the averaging interval is lengthened enough to see the full complement of the mixed workload thereby allowing for more opportunities to correct consumption through an increase or decrease of either the subject or competing workloads. Further, lengthening the averaging interval also allows fuller utilization of system resources as a whole by not requiring resources to be withheld for the scenario of a particular workload having a new query arrival that requires immediate access.

An averaging interval that is too long can result in unacceptable queuing delays. Consider a workload, X, that has over-consumed system resources in the earlier part of a 24-hour averaging interval when other workloads were not demanding their share of resources. Later during the averaging interval when other workloads are demanding their targeted share of the system, the workload X would be required to stop consuming resources to enable the other workloads to "catch-up" and meet their target consumption goals. This disallowance of system resource consumption could last for an unacceptable duration. On the other hand, if the averaging interval were shorter, for example, 1 hour, the workload X could continue consuming in subsequent averaging intervals (hours of the day) because the "over-consumption" from the first hour does not carry forward to the subsequent hours of the day and are written off as acceptable over-consumption due to lack of competing demand for that earlier hour.

An averaging interval that is too short may result in a different issue. If there are queries that require processing for extensive periods, the queries may not complete within the averaging interval. If such queries execute in a low-concurrency environment, it may result in difficulty to suppress an over-consuming workload.

Notably, it may be disadvantageous to utilize a qualification period to delay resource consumption adjustments. In the examples above, the qualification period was set to three intervals, i.e., no adjusts are implemented until three consecutive intervals of non-conformance. However, because the goal is to control CPU consumption, such a mechanism allows the non-conformance to increase higher rather than keeping the conformance constantly in check. Further, by not allowing the non-conformance to grow, conformance may be more quickly obtained when non-conformance occurs.

In accordance with an embodiment, the analysis may be performed at each event interval. Consider the following example of a large system resource over-consumption. Given a WD-D system resource consumption target of 4.8%, consider a single interval and also a rolling average consumption of 33%. In this instance, the resource over-consumption is 6.9 (33/4.8) times the target consumption. To bring consumption back consistent with the consumption target, the above described algorithm would adjust from the current concurrency level of 10 down to 1.4 (rounded down to 1). This should result in a quick return to conformance if at the end of the first interval there remains no more than 1 executing queries from WD-D—the throttling would simply not allow a new query to start until the rolling average is back to conformance. However, if at the end of the interval, there were still more than one queries executing from the workload WD-D, the over-consumption would continue. The resource over consumption may not continue at such a level if, for example, some of the executing queries completed during the interval or if other workloads interject into the system thereby removing system resources away from the workload WD-D. Nonetheless, the chance that over-consumption will still exist in the next interval is relatively high.

In the next event interval, the analysis would repeat thereby resulting in a more refined adjustment to concurrency levels. The iterative nature of this algorithm that occurs frequently (at every event interval) provides a means for continually adjusting to the actual dynamics of the system, particularly since throttle adjustments are not guaranteed to have an immediate effect but, rather, are subject to queries completing, new arrivals, and competing workload activities. A delay in this iteration would lead to less refined control.

Further, adjusting at every event interval mitigates any need to additionally adjust new throttle assignments based on new throttle assignments being assigned to other workloads. As noted hereinabove, a concurrency reduction of one workload may result in an increase of CPU utilization in another workload, and vice versa. That suggests that that an iterative evaluation should be performed within every event interval to fine-tune the new throttle adjustments in light of other WD throttle adjustments. However, because an adjustment to a throttle does not necessarily indicate concurrency will immediately be affected, it may be counter-productive to perform an iterative adjustment at every event interval. It is just as effective, or possibly more so, to perform the analysis once per event interval and base any new adjustments in the next event interval on the actual behavior changes that were observed as opposed to basing an adjustment on desired behavior changes.

In accordance with another embodiment, a DBA, or another suitable entity, may provide inputs comprising a concurrency restriction band including a minimum concurrency and maximum concurrency (MinCon, MaxCon) as discussed above. The concurrency restriction band specifies an allowable level of resource consumption. By default, the concurrency restriction band may range from 0 to unlimited concurrency, and the algorithm discussed above would employ resource consumption adjustment based on the concurrency throttle ($C_n$) unconstrained. With any element of the concurrency restriction band specified, the conditional resource throttle algorithm would undergo a final adjustment before being applied on a workload to assure it is within the range of the specified band. For example, if $C_n$ were determined to be 0, but the DBA defined the band to be from 1 to 20, $C_n$ would set the allowable low end of concurrency in conformance with the concurrency restriction band—i.e., in this example the minimum allowable consumption would be set to 1 rather than 0.

In a typical workload environment, e.g., in which the system resources are generally highly busy with mixed-workloads, it has conventionally been considered unnecessary to restrict the concurrency control to a narrower range than 0-unlimited. However, consider the following scenarios in which a concurrency restriction band may advantageously be employed.

Concurrency banding restrictions may be utilized to disallow too low concurrency levels which in turn could result in underutilization of the system and/or to prevent unconstrained concurrency levels of a workload that can in turn make it difficult for a new request in another workload to obtain any resources. Different conditional resource throttle settings may be utilized in operating environments that are typically high mixed volume versus operating environments that are not. For example, in a highly utilized, consistently mixed operating environment, the use of concurrency banding restrictions may be unnecessary. In a low or inconsistently utilized environment, concurrency banding restriction may be utilized or the conditional resource throttle may be disabled whereby no throttle is utilized or a basic concurrency throttle is utilized. In other implementations, a special logic may qualify a throttle adjustment as low as zero based on actual workload concurrency, workload queue-depths, competing workload concurrencies and queue depths, actual AG weight versus assigned weight, etc. For example, the qualification may need to be on any low concurrency adjustment, not just when being set to zero with the goal being to not hinder the system from being fully utilized while at the same time disallowing the throttle to be set so high that if an incoming competing workload arrives it is unable to obtain a target share of the CPU.

In many scenarios, a workload will not demand its target CPU %. In such a situation, it is desirable for the non-used CPU % to be redistributed for use by other workloads. In an environment where this "sharing" of resources is acceptable, the metrics to evaluate success in management are complicated by this lack of workload demand. Therefore, it is a requirement to log both the resource consumption and demand by workload for future analysis and trending studies. Accordingly, workload logging may be implemented by event interval as well as averaging interval arrivals versus completions and further comparing the actual versus target consumption. Further, logging may record current relative targets, throttle changes, and queue depth. For example, if workload arrivals are less or equal than completions, and actual consumption is less than target consumption, the demand may not have been enough to enable the workload to reach target consumption. As another example, if arrivals are greater than completions, actual consumption may be expected to be substantially equal to or greater than target consumption. If arrivals are greater than completions, and target consumption is less than the actual consumption, such a situation may indicate a problem with another workload over consuming system resource, e.g., perhaps due to long running queries and insufficient concurrency levels to reduce the consumption of the long running queries. Such a situation may be flagged as a potential detection that could be automatically acted upon to alleviate the over consumption issue.

A conditional workload throttle may be defined for many WDs. Notably, there is no requirement for a conditional workload throttle to be defined on all WDs if there are conditional workload throttles defined on one or more WDs. Further, the specification of a resource throttle does not preclude the ability to specify a concurrency throttle. The resource throttle may be enforced (or queued) first before concurrency throttles for an individual workload.

As described, mechanisms for adjusting a workload's system resource consumption against a target consumption level and maintenance of the consumption to the target within an averaging interval by dynamically controlling workload concurrency levels are provided. The disclosed embodiments provide for compensating system consumption during periods of over or under-consumption by adjusting workload consumption to a larger averaging interval. Further, mechanisms for limiting, or banding, dynamic concurrency adjustments to disallow workload starvation or unconstrained usage at any time are allowable if the DBA so chooses. Still further, the workload management routines provide for category of work prioritization goals and subject-area resource division management goals, allow for unclaimed resources due to a lack of demand from one workload to be used by the active workloads to yield full system utilization at all times, and provide for monitoring success in light of the potential relative effects of workload under-demand, and under/over-consumption management.

The flowcharts of FIGS. 7-9 depict process serialization to facilitate an understanding of disclosed embodiments and are not necessarily indicative of the serialization of the operations being performed. In various embodiments, the processing steps described in FIGS. 7-9 may be performed in varying order, and one or more depicted steps may be performed in parallel with other steps. Additionally, execution of some processing steps of FIGS. 7-9 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of managing workloads in a database system deployed in a computer system, comprising:
    specifying a target consumption for a workload that specifies a target computer system resource consumption;
    specifying an averaging interval over which an average of system resource consumption of the workload is monitored internally in the database system;
    calculating, at a pre-defined interval, a current system resource consumption of the workload;
    calculating, at the pre-defined interval, the average of the system resource consumption over the specified averaging interval for the workload;
    calculating at least one of a concurrency level and a rolling average concurrency level, wherein the concurrency level specifies a number of queries of the workload that may be concurrently executed that would drive the current system resource consumption to the target consumption, and wherein the rolling average concurrency level specifies a number of queries of the workload that may be concurrently executed that would drive the average of the system resource consumption to the target consumption; and
    adjusting a concurrency throttle assigned to the workload that specifies a number of queries of the workload that may be concurrently processed in the database system based on at least one of the concurrency level and the rolling average concurrency level.

2. The method of claim 1, wherein calculating at least one of the concurrency level and the rolling average concurrency level and adjusting the concurrency throttle are performed at an event interval specified for the workload.

3. The method of claim 1, further comprising:
    allocating a plurality of allocation groups each respectively assigned a percentage of system resources of the computer system; and
    assigning the workload to a first allocation group of the plurality of allocation groups.

4. The method of claim 3, wherein specifying the target consumption comprises specifying the target computer system resource consumption as a portion of the respective system resources allocated to the first allocation group.

5. The method of claim 3, wherein the current system resource consumption comprises a current system resource consumption percentage of the respective percentage of system resources allocated to the first allocation group, the average of the system resource consumption comprises an average system resource consumption over the averaging interval as a percentage of the respective percentage of system resources allocated to the first allocation group, wherein calculating the concurrency level comprises calculating the concurrency level as a function of the target consumption, a number of queries of the workload currently being processed in the computer system, and the current system resource consumption, and wherein calculating the rolling average concurrency level comprises calculating the rolling average concurrency level as a function of the target consumption, the number of queries of the workload currently being processed in the computer system, and the average of the system resource consumption.

6. The method of claim 1, further comprising, responsive to adjusting the concurrency throttle, evaluating whether a query of the workload may be released from a queue for processing in the computer system.

7. The method of claim 1, wherein adjusting the concurrency throttle based on at least one of the concurrency level and the rolling average concurrency level comprises setting the concurrency throttle to an average of the concurrency level and the rolling average concurrency level.

8. A computer-readable medium having computer-executable instructions for execution by a processing system, the computer-executable instructions for managing workloads in a database system deployed in a computer system, the computer-executable instructions, when executed, cause the processing system to:
    specify a target consumption for a workload that specifies a target computer system resource consumption;
    specify an averaging interval over which an average of system resource consumption of the workload is monitored internally in the database system;
    calculate, at a pre-defined interval, a current system resource consumption of the workload;
    calculate, at the pre-defined interval, the average of the system resource consumption over the specified averaging interval for the workload;
    calculate at least one of a concurrency level and a rolling average concurrency level, wherein the concurrency level specifies a number of queries of the workload that may be concurrently executed that would drive the current system resource consumption to the target consumption, and wherein the rolling average concurrency level specifies a number of queries of the workload that may be concurrently executed that would drive the average of the system resource consumption to the target consumption; and
    adjust a concurrency throttle assigned to the workload that specifies a number of queries of the workload that may be concurrently processed in the database system based on at least one of the concurrency level and the rolling average concurrency level.

9. The computer-readable medium of claim 8, wherein the instructions that calculate at least one of the concurrency level and the rolling average concurrency level and the instructions that adjust the concurrency throttle are invoked at an event interval specified for the workload.

10. The computer-readable medium of claim 8, further comprising instructions that, when executed, cause the processing system to:
    allocate a plurality of allocation groups each respectively assigned a percentage of system resources of the computer system; and
    assign the workload to a first allocation group of the plurality of allocation groups.

11. The computer-readable medium of claim 10, wherein the instructions that specify the target consumption comprise instructions that, when executed, cause the processing system to specify the target computer system resource consumption as a portion of the respective system resources allocated to the first allocation group.

12. The computer-readable medium of claim 10, wherein the current system resource consumption comprises a current system resource consumption percentage of the respective percentage of system resources allocated to the first allocation group, the average of the system resource consumption comprises an average system resource consumption over the averaging interval as a percentage of the respective percentage of system resources allocated to the first allocation group, wherein the instructions that calculate the concurrency level comprise instructions that, when executed, cause the processing system to calculate the concurrency level as a function of the target consumption, a number of queries of the workload currently being processed in the computer system, and the current system resource consumption, and wherein the instructions that calculate the rolling average concurrency level comprise instructions that, when executed, cause the processing system to calculate the rolling average concurrency level as a function of the target consumption, the number of queries of the workload currently being processed in the computer system, and the average of the system resource consumption.

13. The computer-readable medium of claim 8, further comprising instructions that, when executed, cause the processing system to, responsive to adjusting the concurrency throttle, evaluate whether a query of the workload may be released from a queue for processing in the computer system.

14. The computer-readable medium of claim 8, wherein the instructions that adjust the concurrency throttle based on at least one of the concurrency level and the rolling average concurrency level comprise instructions that, when executed, cause the processing system to set the concurrency throttle to an average of the concurrency level and the rolling average concurrency level.

15. A computer system having a database management system deployed therein configured to manage workloads, comprising:
    at least one storage medium on which the database management system, a queue data structure, and a database are stored;
    an interface through which a system administrator specifies a target consumption for a workload that specifies a target computer system resource consumption and an averaging interval over which an average of system resource consumption of the workload is monitored internally in the database; and
    at least one processing module that calculates, at a predefined interval, a current system resource consumption of the workload, the average of the system resource consumption over the specified averaging interval for the workload, and at least one of a concurrency level and a rolling average concurrency level, wherein the concurrency level specifies a number of queries of the workload that may be concurrently executed that would drive the current system resource consumption to the target consumption, and wherein the rolling average concurrency level specifies a number of queries of the workload that may be concurrently executed that would drive the average of the system resource consumption to the target consumption, and adjusts a concurrency throttle assigned to the workload that specifies a number of queries of the workload that may be concurrently processed in the database system based on at least one of the concurrency level and the rolling average concurrency level.

16. The system of claim 15, wherein the processing module allocates a plurality of allocation groups each respectively assigned a percentage of system resources of the computer system and assigns the workload to a first allocation group of the plurality of allocation groups.

17. The system of claim 16, wherein the target consumption comprises the target computer system resource consumption as a portion of the respective system resources allocated to the first allocation group.

18. The system of claim 16, wherein the current system resource consumption comprises a current system resource consumption percentage of the respective percentage of system resources allocated to the first allocation group, the average of the system resource consumption comprises an average system resource consumption over the averaging interval as a percentage of the respective percentage of system resources allocated to the first allocation group, wherein the processing module calculates the concurrency level as a function of the target consumption, a number of queries of the workload currently being processed in the computer system, and the current system resource consumption, and wherein the processing module calculates the rolling average concurrency level as a function of the target consumption, the number of queries of the workload currently being processed in the computer system, and the average of the system resource consumption.

19. The system of claim 15, wherein the processing module, responsive to adjusting the concurrency throttle, evaluates whether a query of the workload may be released from the queue data structure for processing in the computer system.

20. The system of claim 15, wherein the processing module adjusts the concurrency throttle as an average of the concurrency level and the rolling average concurrency level.

* * * * *